April 9, 1929.  J. B. RAPER  1,708,779
PRICE INDICATOR FOR LIQUID DISPENSING PUMPS
Filed June 11, 1927  2 Sheets-Sheet 1

J. B. Raper
INVENTOR
BY Victor J. Evans
ATTORNEY

April 9, 1929.                J. B. RAPER                 1,708,779
PRICE INDICATOR FOR LIQUID DISPENSING PUMPS
Filed June 11, 1927          2 Sheets-Sheet 2
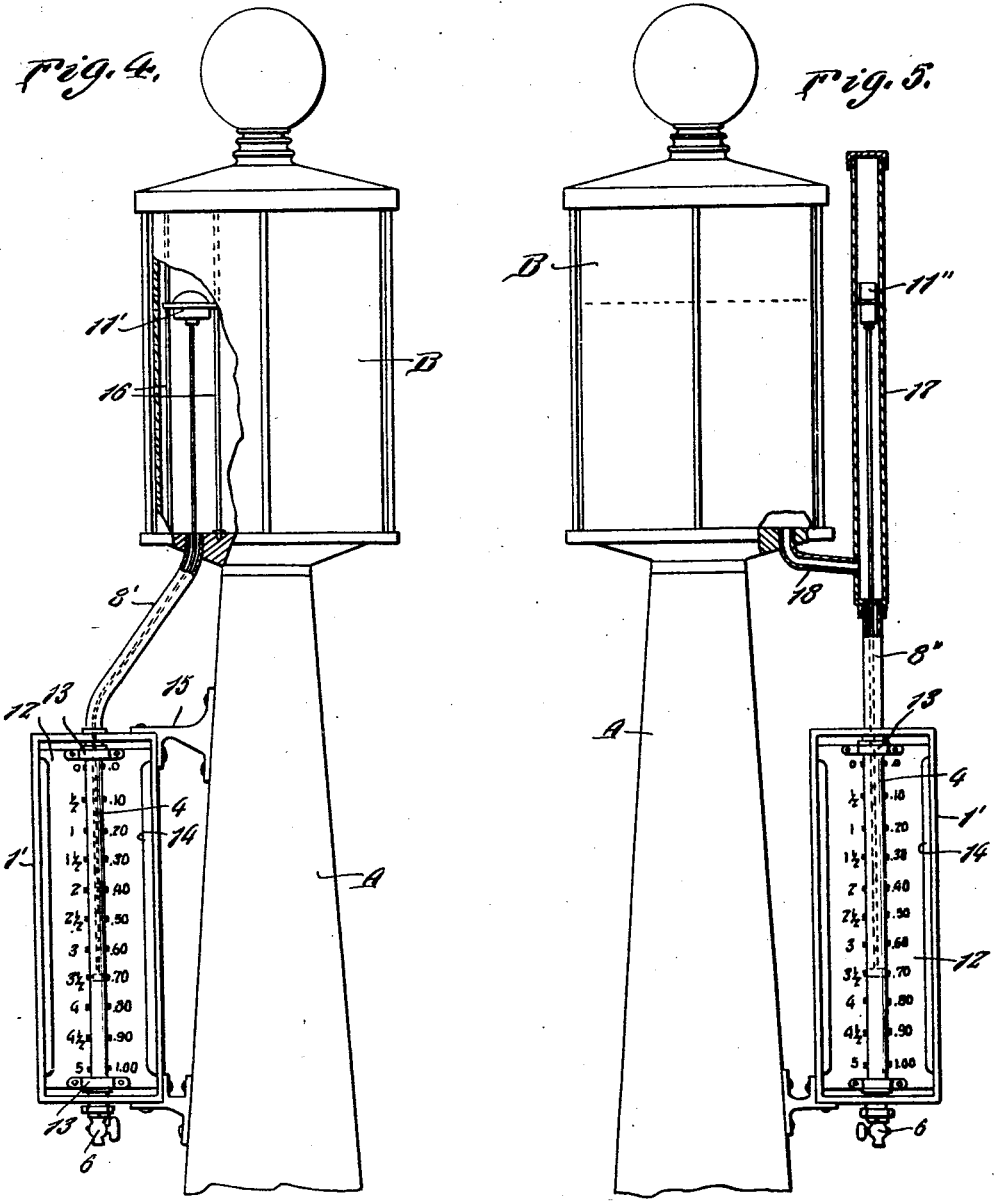

Patented Apr. 9, 1929.

1,708,779

UNITED STATES PATENT OFFICE.

JOHN B. RAPER, OF TONKAWA, OKLAHOMA, ASSIGNOR OF ONE-FOURTH TO VICTOR RAPER AND ONE-FOURTH TO JAMES W. DUNCAN, BOTH OF TONKAWA, OKLAHOMA.

PRICE INDICATOR FOR LIQUID-DISPENSING PUMPS.

Application filed June 11, 1927. Serial No. 198,296.

This invention relates to means for indicating the price and amount of gasoline and other liquids dispensed from a pump, the general object of the invention being to provide an attachment for a pump having float operated means for indicating the quantity and the price of the liquid dispensed by the pump so that the buyer and the attendant can tell at a glance the amount of liquid delivered and the price thereof.

Another object of the invention is to provide means whereby the chart having the data thereon for indicating the prices and quantities can be easily changed when the price of the liquid changes.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is a section on line 3—3 of Figure 1.

Figure 4 is a view showing a different arrangement of parts of the invention.

Figure 5 is a view showing another arrangement.

Figure 1:
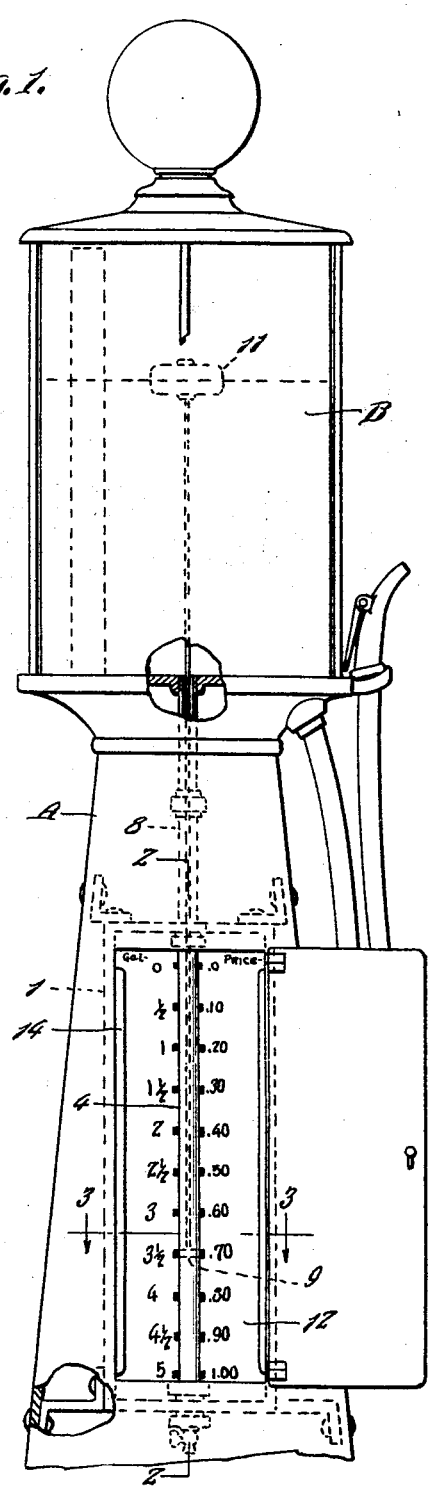
Figure 1 is an elevation, partly in section, showing the invention applied to a pump.
Figure 2:
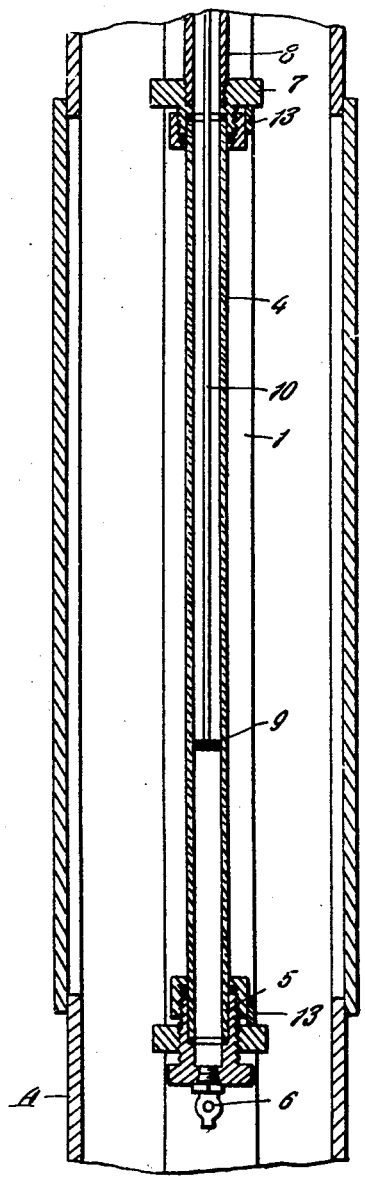
Figure 2 is a section on line 2—2 of Figure 1.

Figures 1 and 2 show the invention arranged at the center of the pump and in these figures, a frame 1 is placed in the body A of the pump, and this frame supports a vertical tube 4 which has its lower end closed by a packing gland 5, a drain cock 6 being carried by the gland. The upper end of the tube is connected by a gland 7 with a sectional pipe 8, the upper end of which is threaded in a hole in the bottom of the container B of the pump.

A perforated piston 9 is arranged in the tube 4 and a rod 10 has its lower end connected with the piston and its upper end is connected with a float 11 arranged in the container, the rod passing through the pipe 8 into the tube. Thus the piston will be adjusted in the tube by the movement of the float in the container, according to the amount of liquid in the container. A chart carrying member 12 is carried by the frame 1, and this member consists of two sections which are connected together by the semi-circular members 13 of spring metal which partly embrace the tube 4, the outer edges of the sections engaging the ribs 14 on the inner faces of the sides of the frame. Thus the chart is removably held in the frame and it can be easily removed and a new one placed therein.

From the foregoing it will be seen that the piston 9 acts as a marker for the chart, for indicating the amount of liquid in the container and the price of the same, it being understood that the chart carries data for indicating the amount of liquid in the container and the price thereof.

As shown in Figure 1, the chart is so supported that it can be seen through the window of the pump when the door thereof is open.

Figure 4 shows the frame 1' carried by brackets 15 fastened to one side of the pump, and in this case, the pipe 8' is connected with the bottom of the container to one side thereof. The float 11' is guided in its movement through means of the rods 16 which are arranged in the container.

Figure 5 shows a somewhat similar arrangement, but in this case I provide a float chamber 17 which is connected with the bottom of the container by means of the tube 18. The float 11'' is arranged in this chamber and the bottom of the chamber is connected to the tube of the indicator by a straight pipe 8''.

The arrangements shown in Figures 4 and 5 are designed especially for pumps already set up, while the arrangement shown in Figure 1 is intended to be built into the pump.

It will, of course, be understood that the tube 4 must be of transparent material so that the piston may be clearly seen. In Figure 4, the float is connected to the indicator or piston by a flexible rod or chain.

Thus I have provided a simple attachment for indicating the quantity of liquid dispensed from a pump and the price thereof, with means whereby the chart can be removed and a new one substituted when the price of the liquid changes.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An attachment for a liquid dispensing pump associated with a container comprising a substantially rectangular frame including side pieces, a vertical tube centrally arranged in the frame, ribs on the inner faces of the side pieces of the frame, a sectional chart in the frame, a section thereof being arranged on each side of the tube, semi-circular members of spring metal connecting the sections together and partly embracing the tube, with the outer edges of the sections engaging the ribs, a float in the container and resting on the surface of the liquid therein and movable in response to the changes in liquid level, a piston in the tube and a member connecting the piston with the float.

In testimony whereof I affix my signature.

JOHN B. RAPER.